(12) United States Patent
French

(10) Patent No.: US 9,194,304 B2
(45) Date of Patent: Nov. 24, 2015

(54) ENGINE BRAKING METHOD AND SYSTEM

(71) Applicant: Cummins Turbo Technologies Limited, Huddersfield (GB)

(72) Inventor: Pierre French, Holmfirth (GB)

(73) Assignee: Cummins Turbo Technologies Limited, Huddersfield (GB)

( * ) Notice: Subject to any disclaimer, the term of this patent is extended or adjusted under 35 U.S.C. 154(b) by 0 days.

(21) Appl. No.: 13/934,000

(22) Filed: Jul. 2, 2013

(65) Prior Publication Data

US 2013/0291828 A1 Nov. 7, 2013

Related U.S. Application Data

(62) Division of application No. 12/536,312, filed on Aug. 5, 2009, now Pat. No. 8,474,433.

(30) Foreign Application Priority Data

Aug. 13, 2008 (GB) .................................. 0814764.7

(51) Int. Cl.
*F01L 13/06* (2006.01)
*F02D 9/06* (2006.01)
(Continued)

(52) U.S. Cl.
CPC *F02D 9/06* (2013.01); *F01D 25/16* (2013.01); *F01D 25/183* (2013.01); *F02B 37/00* (2013.01); *F02B 37/22* (2013.01); *F05D 2220/40* (2013.01); *Y02T 10/144* (2013.01)

(58) Field of Classification Search
CPC ....... F01D 25/16; F02D 25/183; F02B 37/00; F02B 37/22; F02B 9/06; F05B 2220/40

USPC ................. 123/320, 321; 60/597, 600, 605.1, 60/605.3, 278, 280
See application file for complete search history.

(56) References Cited

U.S. PATENT DOCUMENTS

| 3,420,434 A | 1/1969 | Swearingen |
| 3,574,478 A | 4/1971 | Toth, Jr. et al. |

(Continued)

FOREIGN PATENT DOCUMENTS

| DE | 2437530 | 2/1976 |
| DE | 19824913 | 12/1999 |

(Continued)

OTHER PUBLICATIONS

Extended European Search Report, EP12169721.3, Aug. 2, 2012, European Patent Office (Munich), Cummins Turbo Technologies Limited.

(Continued)

*Primary Examiner* — Hai Huynh
*Assistant Examiner* — Raza Najmuddin
(74) *Attorney, Agent, or Firm* — Taft, Stettinius & Hollister LLP

(57) ABSTRACT

During engine braking of a turbocharged internal combustion engine, the exhaust gas pressure increases and this is used to pressurize the seals between the turbocharger shaft and the bearing housing so as to prevent oil leakage into the compressor housing. Immediately after engine braking, stored exhaust gas pressure is used to pressurize the seals at the turbine end so as to prevent oil leakage into the turbine housing. In an alternative arrangement the exhaust gas is used to generate a reduced pressure in the bearing housing to increase the pressure gradient across the seals.

17 Claims, 3 Drawing Sheets

(51) Int. Cl.
*F01D 25/16* (2006.01)
*F01D 25/18* (2006.01)
*F02B 37/00* (2006.01)
*F02B 37/22* (2006.01)

(56) References Cited

U.S. PATENT DOCUMENTS

| | | | |
|---|---|---|---|
| 3,825,311 A | 7/1974 | Murray | |
| 4,196,910 A | 4/1980 | Aizu | |
| 5,526,004 A | 6/1996 | Antipov et al. | |
| 5,890,881 A | 4/1999 | Adeff | |
| 5,924,286 A | 7/1999 | Kapich | |
| 6,623,238 B2 * | 9/2003 | Langston et al. | 415/112 |
| 6,925,805 B2 * | 8/2005 | Koch et al. | 60/602 |
| 7,290,536 B2 * | 11/2007 | Lindmark et al. | 123/572 |
| 7,640,911 B2 * | 1/2010 | Pien | 123/299 |
| 7,886,727 B2 * | 2/2011 | Ulrey et al. | 123/568.15 |
| 2004/0112054 A1 | 6/2004 | Larsson et al. | |

FOREIGN PATENT DOCUMENTS

| | | |
|---|---|---|
| DE | 10144471 | 3/2002 |
| DE | 10330450 | 1/2005 |
| EP | 0131736 A1 | 1/1985 |
| EP | 0704603 A2 | 4/1996 |
| GB | 1497006 | 1/1978 |
| GB | 2011558 | 7/1979 |
| WO | WO 2004/063535 | 7/2004 |

OTHER PUBLICATIONS

Extended European Search Report, EP12169711.4, Aug. 2, 2012, European Patent Office (Munich), Cummins Turbo Technologies Limited.
GB0814764.7 (Search Report) Dec. 4, 2008, Cummins Turbo Tech.
European Search Report, EP 09251877, Oct. 29, 2009.

* cited by examiner

ENGINE BRAKING METHOD AND SYSTEM

CROSS-REFERENCE TO RELATED APPLICATIONS

The present application is a divisional of U.S. patent application Ser. No. 12/536,312 filed Aug. 5, 2009, which claims priority to Great Britain Patent Application No. 0814764.7 filed Aug. 13, 2008, both of which are incorporated herein by reference.

The present invention relates an engine braking method and system for an internal combustion engine. It also relates to a method for reducing oil leakage in a turbocharger.

Engine or exhaust braking systems of various forms are widely used in vehicle engine systems, particularly in relation to diesel engines used to power large vehicles such as trucks. The engine brake systems may be employed to enhance the effect of the conventional friction brakes acting on the vehicle wheels or, in some circumstances, may be used independently of the normal wheel braking system, for instance to control down hill speed of a vehicle. With some engine brake systems, the brake is set to activate automatically when the engine throttle is closed (i.e. when the driver lifts his foot from the throttle pedal), and in others the engine brake may require manual activation by the driver, such as depression of a separate brake pedal.

In one form of conventional engine brake system an exhaust valve in the exhaust line is controlled to block substantially the engine exhaust flow path when braking is required. This produces an engine braking torque by generating a high backpressure that acts on the engine pistons during the exhaust stroke. U.S. Pat. No. 4,526,004 discloses such an engine braking system for a turbocharged engine in which the exhaust valve is provided in the turbine housing of a fixed geometry turbocharger.

Turbochargers are well known devices for supplying air to the intake of an internal combustion engine at pressures above atmospheric (boost pressures). A conventional turbocharger essentially comprises an exhaust gas driven turbine wheel mounted on a rotatable shaft within a turbine housing. Rotation of the turbine wheel rotates a compressor wheel mounted on the other end of the shaft within a compressor housing. The compressor wheel delivers compressed air to the engine intake manifold. The turbocharger shaft is conventionally supported by journal and thrust bearings, including appropriate oil lubricating systems, located within a central bearing housing connected between the turbine and compressor wheel housing. Oil is supplied from the engine and allowed to drain from the bearing housing back to the oil sump in the engine crankcase. It is important to provide an effective sealing arrangement at each end of the rotating shaft to prevent oil leakage from the central bearing housing into the compressor or turbine housing.

At the compressor end of the turbocharger, during its normal operation, the sealing arrangement has to be able to withstand the increasingly high boost pressures that are delivered by modern turbochargers. The pressure of the bearing housing is effectively at the same pressure as the engine oil sump (typically around 100 millibar) and there is thus a pressure gradient between the bearing housing and the compressor housing which prevents the leakage of lubrication oil from the bearing housing into the compressor housing. The sealing arrangement typically comprises one or more ring seals arranged between the shaft and the bearing housing and received in respective grooves, in the manner of piston rings. The seals are arranged with a radial clearance so as to allow the passage of gas in small volumes across the seals but to choke the flow so to accommodate the pressure drop.

At the turbine end of the turbocharger there is a similar sealing arrangement using piston ring seals. Although oil pressure in the bearing housing varies, it will generally be higher than the pressure in the turbine housing behind the turbine wheel (this is the back side of the turbine wheel which is proximate the bearing housing). During normal engine-fired mode the pressure drop from the bearing housing to the turbine housing is such that there can be a risk of oil leakage from the bearing housing into the turbine housing, and thus into the exhaust gas flow. This is undesirable as the high temperatures within the turbine causes the oil to coke and deposits build up within the housing which adversely affect the turbine performance. The presence of the seals mitigates this risk.

Using an exhaust valve to effect engine braking can be problematic in a turbocharged engine. In particular, when the valve is substantially closed so as to effect engine braking by creating the back pressure that brakes the engine, the restriction of the exhaust flow means that the rotational speed of the turbine of the turbocharger is reduced significantly. The compressor wheel thus rotates at a correspondingly low speed with the result that the compressor boost air pressure delivered to the engine is significantly reduced. At low speeds the low (or even negative) boost pressure at the compressor end can drop below the pressure in the bearing housing, particularly when the pressures in the bearing housing are elevated by crankcase gas pressure. As a result oil is able to leak along the turbocharger shaft in the bearing housing, past the seals and into the compressor housing past the seals, particularly if engine braking is used for extended periods of time. The reduction in rotational speed of the shaft means that pressure behind the turbine wheel increases which exacerbates the tendency of the oil to travel along the shaft to the compressor housing. Leakage of oil into the compressor housing is undesirable as it contaminates the pressurised air entering the engine intake manifold.

Immediately after the engine brake is released and normal engine fired mode is resumed, there is a short period during which the shaft accelerates to a steady state. In this period the pressure in the turbine housing is relatively low and there is a risk of oil leaking into the turbine housing from the bearing housing. This is undesirable for reasons mentioned above.

An alternative approach to engine braking is to use a compression brake which operates to modify operation of the engine valves in such a manner that the compressed air in the engine cylinders is allowed to escape when the engine throttle is closed so that the air cannot be used to generate power for the vehicle. However, compression brakes are relatively complex and expensive.

In turbocharged engines it is possible to achieve engine braking by employing a variable geometry turbocharger instead of using an exhaust valve. Variable geometry turbines differ from fixed geometry turbines in that the size of a turbine exhaust gas inlet passageway can be varied to optimise gas flow velocities over a range of mass flow rates so that the power output of the turbine can be varied to suit varying engine demands. In order to achieve engine braking, the inlet passageway may simply be closed to its minimum flow area when braking is required and the level of braking may be modulated by control of the inlet passageway size by appropriate control of the variable geometry.

It is one object of the present invention, amongst others, to obviate or mitigate the aforementioned disadvantages. It is also an object of the present invention to provide for an alternative or an improved engine braking system. It is also an object of the present invention to provide for an improved or alternative method of reducing oil leakage in a turbocharger.

According to a first aspect of the present invention there is provided an engine braking method for an internal combustion engine having an air intake path and an exhaust gas path, a turbocharger comprising a turbine in the exhaust gas path and a compressor in the intake path, the turbine comprising a turbine wheel rotatably disposed in a turbine housing, the compressor comprising a compressor impeller rotatably disposed in a compressor housing, the turbine wheel and compressor impeller being connected by a turbocharger shaft, a bearing housing disposed between the compressor and turbine for housing a bearing assembly to support the turbocharger shaft in rotation, at least one first seal between a compressor end of the shaft and the bearing housing, the method comprising: operating the engine in an engine braking mode by activating an exhaust gas brake to impede the flow of exhaust gas in the exhaust gas path when the engine throttle is closed, thereby generating an exhaust gas backpressure in the exhaust gas path; diverting at least a portion of the exhaust gas during engine braking mode from the exhaust gas path in order to increase the pressure gradient across the at least one first seal in the direction from the bearing housing to the compressor housing.

Increasing the pressure gradient may be achieved by using the diverted exhaust gas to increase the pressure on a compressor side of the at least one first seal or to decrease the pressure on a bearing housing side by, for example, using it to decrease the pressure directly, or indirectly, within the bearing housing. In each case the pressure gradient across the seal is designed to ensure that leakage of lubricant from the bearing housing across the at least one first seal and into the compressor housing is prevented or restricted. It will be understood that increasing the pressure gradient may include reducing a negative pressure gradient (to a less negative value or to a positive value) or substantially equalising the pressures on each side of the at least one first seal.

The exhaust gas may be diverted into a passage in the turbocharger that emerges to one side of the at least one first seal. The passage may pass through the bearing housing.

The exhaust gas may be directed to one side of the at least one first seal to increase the pressure on that side so as to increase the pressure gradient across the seal.

The at least one first seal may be a pair of axially spaced first seals in which case the diverted exhaust gas may be directed to a space between the seals.

The at least one first seal may be disposed at a bore in compressor back plate and the exhaust gas may be directed through a passage in the back plate. Alternatively, the passage may emerge through the bearing housing so as to direct exhaust gas at a back face of the compressor wheel.

The exhaust gas brake may be provided by an exhaust brake valve in the exhaust gas path, preferably downstream of the turbine wheel. It may be disposed in the outlet of the turbine or downstream thereof.

Alternatively, the exhaust gas brake may be provided by a variable geometry turbine in which a movable member is moved to reduce the size of an inlet passageway of the turbine so as to restrict the exhaust gas flow through the turbine and create the back-pressure.

The exhaust gas may be diverted to a bleed path during engine braking mode. The bleed path may include a plenum chamber for the temporary storage of pressurised exhaust gas. The exhaust gas may be permitted to flow out the plenum chamber immediately after operation of the engine in engine braking mode to maintain the favourable pressure gradient across the at least one first seal for a short period. The plenum chamber may be selectively put in fluid communication with at least one second seal provided between a turbine end of the shaft and the bearing housing, preferably after operation of the engine in the engine braking mode so as to provide a favourable pressure gradient across the at least one second seal.

The bleed path may include a valve, the valve being operated to close the bleed path when the engine is not being operated in engine braking mode.

The diverted exhaust gas may be filtered in the bleed path.

The increased pressure gradient may be achieved by delivering the diverted exhaust gas into a conduit in fluid communication with the bearing housing. For example, the conduit may be connected, directly or indirectly, to a crankcase ventilation port of the engine at a location downstream of the port, the exhaust gas being passed through a jet pump arrangement so as to effect a decrease in pressure in the conduit, the pressure in the engine crankcase and therefore the bearing housing of the turbocharger.

According to a second aspect of the present invention there is provided an engine braking system comprising: an internal combustion engine with an air intake path and an exhaust gas path; a turbocharger comprising a compressor for delivering pressurised air to the air intake path and a turbine for receipt of the exhaust gas from the engine, the turbine comprising a turbine wheel rotatably disposed in a turbine housing, the compressor comprising a compressor impeller rotatably disposed in a compressor housing, the turbine wheel and compressor impeller being connected by a turbocharger shaft, a bearing housing disposed between the compressor and turbine for housing a bearing assembly to support the turbocharger shaft in rotation, at least one first seal between the shaft and a compressor end of the bearing housing; an exhaust gas brake in the exhaust gas path and operable to effect engine braking, an exhaust gas bleed path extending from the exhaust gas path to a location between the at least one first seal and the compressor housing for diverting at least a portion of the exhaust gas from the exhaust gas path during engine braking The at least one first seal may comprise an annular seal which may be split and may be in the form of a piston ring. It may be received in a groove defined in the shaft or a boss or other component fixed to, or integrally formed with, the shaft. The at least one first seal may be supported in a bore in the bearing housing, including, for example, in a bore defined in a compressor back plate disposed between the compressor and an interior of the bearing housing.

According to a third aspect of the present invention there is provided an engine braking system comprising: an internal combustion engine with an air intake path and an exhaust gas path; a turbocharger comprising a compressor for delivering pressurised air to the air intake path and a turbine for receipt of the exhaust gas from the engine, the turbine comprising a turbine wheel rotatably disposed in a turbine housing, the compressor comprising a compressor impeller rotatably disposed in a compressor housing, the turbine wheel and compressor impeller being connected by a turbocharger shaft, a bearing housing disposed between the compressor and turbine for housing a bearing assembly to support the turbocharger shaft in rotation, at least one first seal between the shaft and a compressor end of the bearing housing; an exhaust gas brake in the exhaust gas path and operable to effect engine braking, an exhaust gas bleed path extending from the exhaust gas path to a jet pump in fluid communication with the bearing housing.

The engine may further comprise a crankcase with a ventilation port for the venting of gas, the jet pump being disposed downstream of the crankcase ventilation port, preferably in a conduit connected thereto.

According to a fourth aspect of the present invention there is provided a method for reducing oil leakage in a turbocharger comprising a compressor for delivering pressurised air to an air intake path of an internal combustion engine, and a turbine for receipt of the exhaust gas from the engine, the turbine comprising a turbine wheel rotatably disposed in a turbine housing, the compressor comprising a compressor impeller rotatably disposed in a compressor housing, the turbine wheel and compressor impeller being connected by a turbocharger shaft, a bearing housing disposed between the compressor and turbine for housing a bearing assembly to support the turbocharger shaft in rotation, at least one first seal between a compressor end of the shaft and the bearing housing, activating an exhaust gas brake to impede the flow of exhaust gas into the turbine and diverting at least a portion of the impeded exhaust gas flow in order to increase the pressure gradient across the at least one first seal in the direction from the bearing housing to the compressor housing.

According to a fifth aspect of the present invention there is provided a method for reducing oil leakage in a turbocharger comprising a compressor for delivering pressurised air to an air intake path of an internal combustion engine, and a turbine for receipt of the exhaust gas from the engine, the turbine comprising a turbine wheel rotatably disposed in a turbine housing, the compressor comprising a compressor impeller rotatably disposed in a compressor housing, the turbine wheel and compressor impeller being connected by a turbocharger shaft, a bearing housing disposed between the compressor and turbine for housing a bearing assembly to support the turbocharger shaft in rotation, at least one seal between a turbine end of the shaft and the bearing housing, activating an exhaust gas brake to impede the flow of exhaust gas into the turbine and diverting at least a portion of the impeded exhaust gas flow into a plenum chamber for storage therein, and following deactivation of the engine gas brake releasing the stored exhaust gas flow and directing it to the at least one seal in order to increase the pressure gradient across the at least one seal in the direction from the bearing housing to the turbine housing.

This method may be used in conjunction with any of the aforementioned methods. In particular the plenum chamber may also supply stored exhaust gas to a compressor end seal or seals after engine braking in addition to exhaust gas being supplied during engine braking.

Specific embodiments of the present invention will now be described, by way of example only, with reference to the accompanying drawings, in which.

Figure 1:
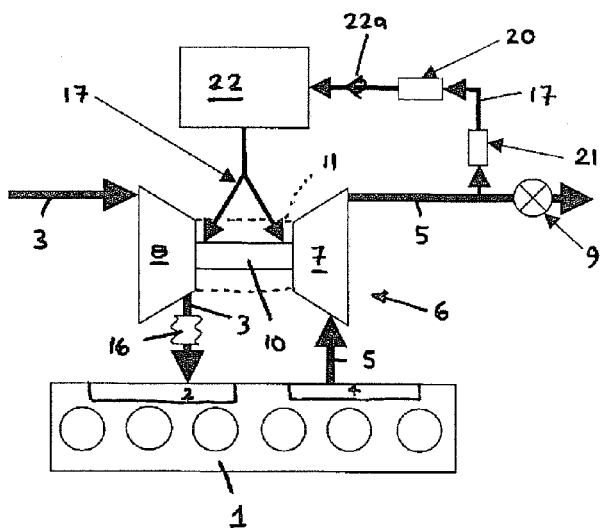
FIG. 1 is a diagrammatic representation of an engine braking system of the present invention.
Figure 2:
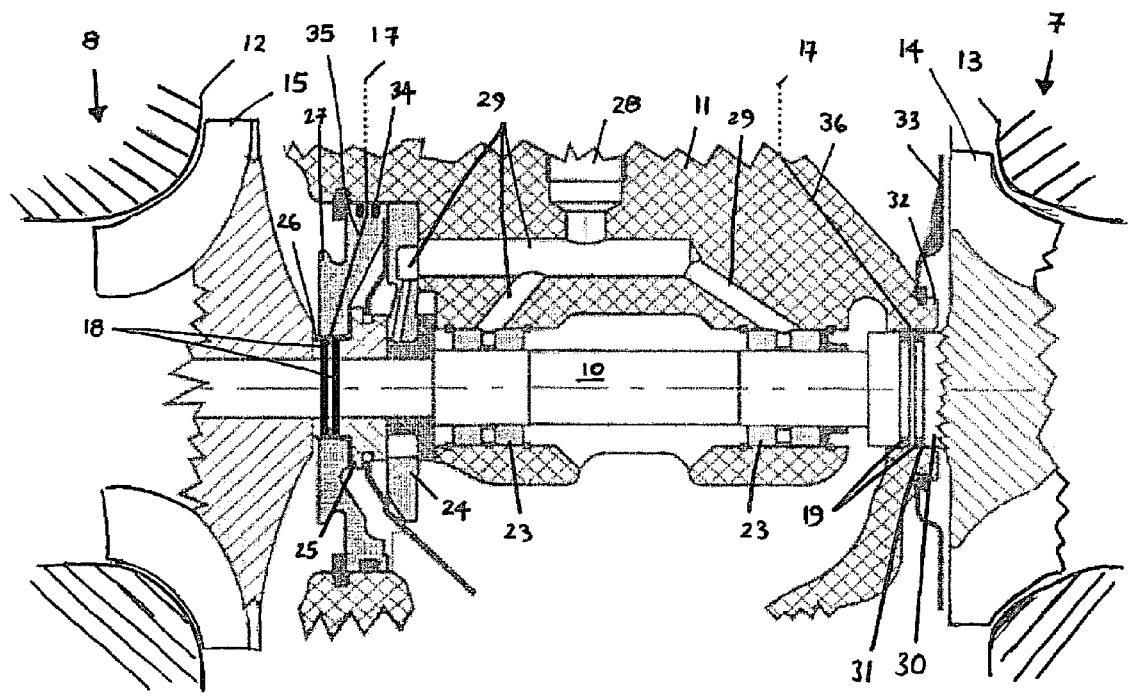
FIG. 2 is a longitudinal sectioned view through part of a turbocharger in accordance with the present invention.

Referring to FIGS. 1 and 2, an internal combustion engine 1 using compression ignition has an inlet manifold 2 for the introduction of air via an air inlet path 3 and an exhaust manifold 4 for the expulsion of exhaust gases to an exhaust gas path 5. The engine 1 is turbocharged by a turbocharger 6 comprising a turbine 7 in the exhaust gas flow path 5 and a compressor 8 in the air inlet path 3. An exhaust brake valve 9 is disposed downstream of the turbine 7 in the exhaust gas flow path 5 and in operation can be used to restrict selectively the flow of exhaust gas in the path 5 and apply engine braking.

The compressor 8 and turbine 7 are interconnected by a common turbocharger shaft 10 that is supported for rotation in a bearing housing 11 disposed between housings 12, 13 (see FIG. 2) of the compressor 8 and turbine 7 respectively. In operation, exhaust gas enters the turbine housing 13 where it rotates a turbine wheel 14 (FIG. 2), which in turn rotates a compressor wheel 15 (FIG. 2) of the compressor 8, the compressor impeller wheel 15 drawing intake air from atmosphere and delivering boost air to the inlet manifold 2 of the engine 1 via an intercooler 16 (FIG. 1).

During engine braking i.e. when the exhaust brake valve 9 is substantially closed, exhaust gas is bled from the exhaust gas flow path 5 at a suitable position and is selectively directed along bleed path 17 to seals 18, 19 (FIG. 2) between the turbocharger shaft 10 and the bearing housing 11 via a bleed valve 20. A first pair of seals 18 is disposed immediately adjacent to the compressor 8 and a second pair of seals 19 is disposed immediately adjacent to the turbine 7. In each case the seals 18, 19 are designed to help maintain a pressure differential between the relatively low pressure environment of the bearing housing 11 and the potentially high pressure environment of the compressor housing 12 and the low pressure at the back face of the turbine 7 in the turbine housing 13 during operation of the engine in a normal fired mode. This prevents bearing oil (or other lubricant) leaking along the turbocharger shaft 10 across the seals 18, 19 and into the compressor or turbine housings 12, 13. When the engine is operated in braking mode, the back-pressure generated serves to reduce the rotation speed of the turbocharger significantly and, as a consequence the compressor boost pressure drops such the pressure difference across the seals 18 is not so marked or even reverses in direction. The supply of exhaust gas (air) to the seals 18 via path 17 during engine braking thus serves to maintain a pressure difference such that leakage of oil into the compressor housing 12 is prevented or significantly restricted. Similarly exhaust gas (air) can be supplied to the turbine end seals 19, if required, so as to prevent leakage of oil into the turbine housing 13. In practice this may only be required for a short period immediately after engine braking when the engine resumes in normal fired mode.

The valve 20 is operable to permit exhaust gas to flow along path 17 to the seals 18 only when the exhaust brake valve 9 is closed so as to apply engine braking. Conversely, the valve 20 is closed to prevent the passage of the exhaust gas to the seals 18 generally when the exhaust brake valve 9 is open (i.e. during engine-fired mode). The valve 20 may be an electrically-operated valve under the control of the engine management system or otherwise. It may be biased closed by a suitable biasing means such as a spring or the like and designed such that once the pressure in the path rises to engine braking levels the valve is opened automatically against the action of the spring. A filter 21 (FIG. 1) is used to remove carbon and/or other particulates from the engine braking gas before it reaches the seals 18, 19. An optional gas plenum chamber 22 (which can be any sort of pressure vessel including part of an accumulator or the like) is provided to retain a temporary storage of the gas. The chamber 22 allows for pressurised gas to be delivered to one or both of the seals 18, 19 for a short period of time after the valve 20 is closed so as to maintain the pressure at the seals for the short time period after the engine braking mode is over (and when normal fired mode resumes) and the turbocharger shaft 10 accelerates to a steady state condition. This may be particularly desirable in relation to the turbine end seals 19 for reasons discussed above and on this basis, in one embodiment, the plenum chamber 22 is only employed in a dedicated path to the turbine end seals 19. A check valve 22a, or other one-way valve, is provided at the plenum chamber to prevent air escaping from the chamber 22 back into the exhaust passage.

The application of exhaust gas to improve the sealing of the shaft 10 during exhaust braking takes advantage of the fact that in a diesel engine 1 the gas flowing in the exhaust gas flow path 5 during engine braking is essentially clean air. This is because in a diesel engine air and fuel are delivered into the engine combustion cylinders separately and when the driver of a vehicle with a diesel engine closes the fuel throttle (i.e. when the driver lifts his foot from the throttle pedal) air still flows into the engine cylinders where it is compressed and exhausted despite the fact that no fuel is delivered.

The relevant parts of the turbocharger are shown in more detail in FIG. 2. The turbine wheel 14 is rotatably disposed with the shaft 10 in the turbine housing 13 and, similarly, the compressor impeller 15 rotates with the shaft 10 in the compressor housing 12. The turbine wheel 14 and compressor impeller wheel 15 are mounted on opposite ends of the common turbocharger shaft 10, which is rotatable on a pair of journal bearings 23 in the bearing housing 12 connected between the compressor and turbine housings 12, 13.

The compressor end of the shaft 10 supports a thrust bearing assembly 24 that interacts with an oil seal assembly rotatable with the shaft 10. The oil seal assembly comprises an oil slinger 25 with an integral axial boss 26 about which the pair of seals 18 is disposed immediately adjacent to the compressor impeller 15. The seals 18 are in the form of axially spaced, split piston rings disposed in annular grooves in the boss 26 which extends through a bore in a compressor back plate 27 that serves as an end wall of the bearing housing 11 separating it from the compressor housing 12. The seals 18 are supported on a circumferential surface that defined the bore through the back plate 17 and extend part way into the grooves thereby providing a labyrinthine sealing arrangement that is known in the art. Oil is delivered through a generally radial passage in the thrust bearing assembly 24 for lubricating the same and the oil slinger 25 is designed to prevent the oil reaching the compressor-end seals 18. The slinger 25 typically comprises a number of radially extending passages, which effectively act as vanes for slinging oil away from the shaft 10 and in particular away from the compressor-end seals 18 and the compressor housing 12. Details of the compressor end bearings and oil slinger are not important to an understanding of the present invention and will not be described further. Oil is supplied to the bearing housing 11 from the oil system of the internal combustion engine 1 via oil inlet 28 and is fed to the journal bearings 18,19 and the thrust bearing 24 by oil passageways 29. It drains from the bottom of the bearing housing 11 into the oil sump of the engine crankcase.

The turbine wheel 14 is joined to the turbine end of the turbocharger shaft 10 at a seal boss 30. Generally the seal boss 30 is formed integrally with the shaft 10 (and as such forms part of the shaft) and is joined (for instance by friction welding) to a boss portion on the back of the turbine wheel 14. The seal boss 30 extends through a bore 31 in a wall 32 of the bearing housing 11 and into the turbine housing 13. The seal boss 30 is sealed with respect to a circumferential surface of the wall 32, that defines the bore 31, by the axially spaced seals 19, each in the form of a piston split ring. The seals 19 extend radially from the wall 32 surface into grooves defined in the boss 30 but leave a radial clearance so as to provide a labyrinthine sealing arrangement that inhibits oil and gas leakage through the bore 31, as is known in the art.

A pressed metal heat shield 33 is located in the turbine housing 13 between the turbine wheel 14 and the bearing housing 11. The heat shield separates the hot exhaust gas flow from the bearing housing to reduce heat transfer to the bearing housing which could otherwise result in overheating of the bearings 23.

The air path 17 from the exhaust path 5 to the compressor end seals 18 is defined in part by a passage 35 through the bearing housing 11 and the compressor back plate 27, although other routes through the bearing housing 11 may be possible. The outer edge of the back plate 27 is sealed at 34 to the bearing housing in the region around the passage 35. At the turbine end, the air path is defined in part by a passage 36 through the bearing housing 11 and the wall 32, and emerges into the bore 32 between the seals 19.

The pressurised air developed during engine braking is delivered to a location between each seal in the compressor end seal pair 18 via the air path 17 including passage 35. Here the air provides a positive pressure gradient (or reduces the unfavourable negative pressure gradient) across the axially outermost seal so as to prevent or restrict oil (or other contaminants) progressing along the shaft 10 from the bearing housing 11 to the compressor housing 12 past the seal 18. Even if the raised pressure between the seals remains below that within the bearing housing 11 in the region of the seal, the pressure difference across the seals may nevertheless be reduced and so restrict oil leakage. However, it is preferable that the pressure within the space is at a level at least generally approximate the maximum pressure that will occur in the bearing housing 11 adjacent to the seals 18, and more preferably still higher than this level.

When the engine brake valve 9 is opened to so as to allow resumption of normal engine fired mode the exhaust gas is directed into at least the passage 36 so as to apply a favourable pressure gradient across the turbine end seals 19 thereby preventing or restricting oil entering the turbine housing 13 from the bearing housing 11.

It is to be appreciated that the passage 36 may be omitted in some of the embodiments so that only the compressor end seals 18 are pressurised. Alternatively, a suitable valve may be provided in the path 17, which is operable to direct the exhaust gas pressure generated during engine braking just to the compressor end seal pair 18 and to allow gas to flow to the turbine end seal pair 19 at the end of engine braking.

Figure 3:
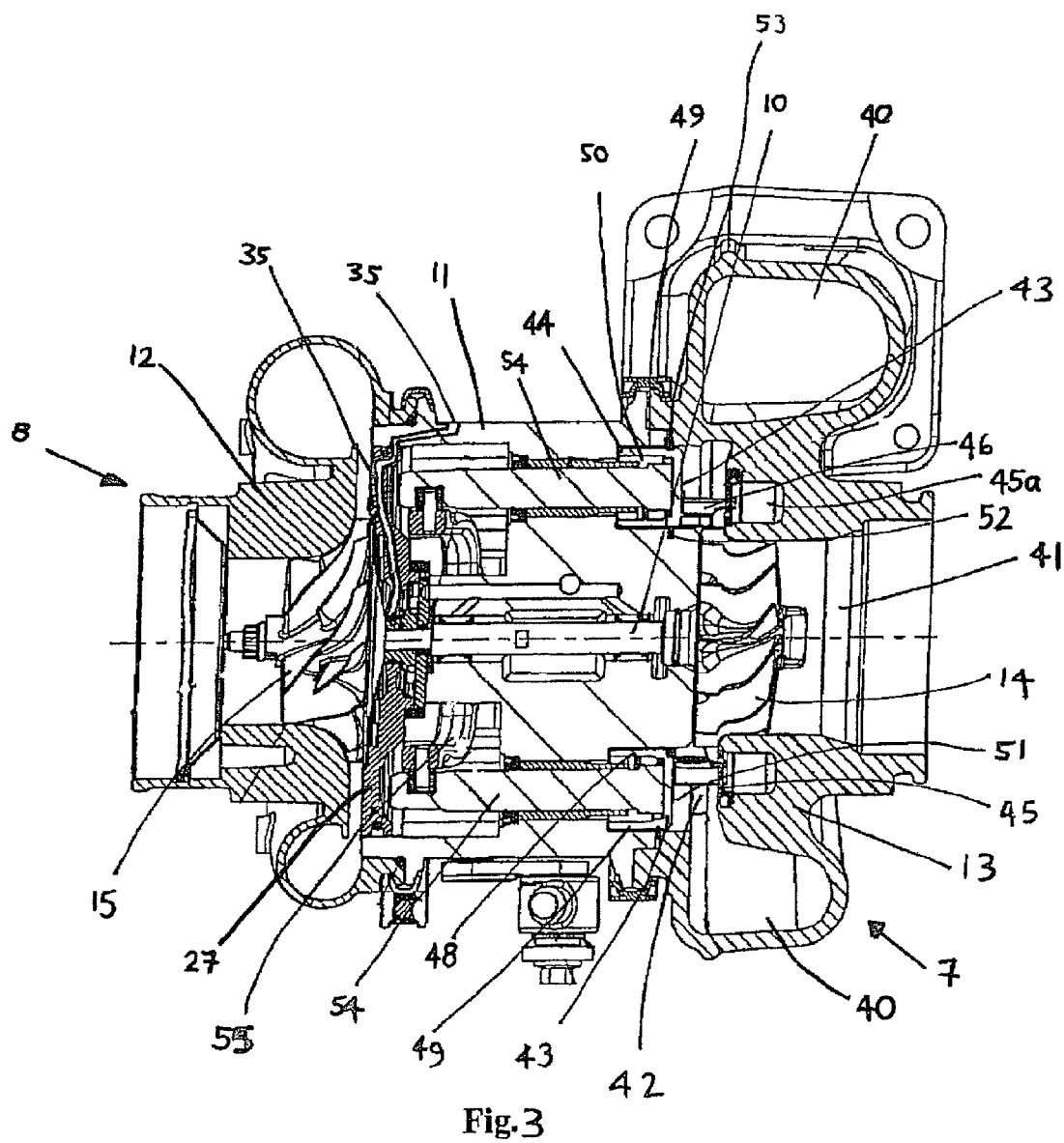
FIG. 3 is a longitudinal section view through an alternative turbocharger embodiment in accordance with the present invention.

FIG. 3 shows an embodiment in which the turbocharger 6 has a variable geometry turbine 7. In this embodiment the exhaust brake valve 9 may be omitted on the basis that exhaust braking is provided by closing down the turbine inlet as will be described below. For convenience and ease of understanding, the same reference numerals have been used in FIG. 3 for parts common to FIGS. 1 and 2.

The turbine housing 13 defines a volute or inlet chamber 40 to which exhaust gas from the exhaust manifold 4 of the internal combustion engine 1 is delivered. The exhaust gas flows from the inlet chamber 40 to an outlet 41 via an annular inlet passageway 42 defined on one side by a radial wall 43 of a movable annular member 44, and on the other side by a facing radial shroud plate 45 of the housing 13. A circumferential array of nozzle vanes 46 extends across the inlet passageway 42 from the radial wall 43, the vanes 46 and wall 43 being collectively referred to in the art as the "nozzle ring". The shroud plate 45 is perforated by slots through which the vanes 46 are movable into an annular cavity 45a defined in the bearing housing.

Exhaust gas flowing from the inlet chamber 40 to the outlet 41 passes through the inlet passageway 42 and over the turbine wheel 14, which, as a result, drives the compressor impeller wheel 15 via the turbocharger shaft 10.

The moveable member 44 of the variable geometry turbine comprises not only the radial wall 43 but also axially extending outer and inner annular flanges 48, 49 that extend from an outer end of the radial wall 43 into an annular cavity 50 provided in the turbine housing 13. With the turbine construction shown in the figures, the majority of the cavity 40 is in fact defined by the bearing housing 11. This is purely as a result of the construction of the particular turbocharger to which the invention is in this instance is applied and for the purposes of the present invention no distinction is made between the turbine housing and bearing housing in this regard. The cavity 50 has a radially extending annular opening 51 defined between radially inner and outer annular surfaces. A seal ring 52 is located in an annular groove provided in inner annular surface and bears against the inner annular flange 48 of the movable member 44 to prevent exhaust gas flowing through the turbine wheel 14 via the cavity 50 rather than the inlet passageway 42. A similar ring seal 53 is provided between the outer flange 49 and the wall of the cavity 50.

The movable member 44 is supported on axially extending guide rods 54 that are arranged so that they can reciprocate in the bearing housing 11. An actuator 56 such as, for example, a motor or a pneumatic actuator, is operable to control the axial position of the guide rods 54, and therefore the movable member 44, via a control linkage 55 in a manner which is well known in the art. By appropriate control of the actuator the axial position of the movable member 44 can be controlled so as to vary the size of the inlet passageway 42 between the radial wall 43 and the facing shroud plate 45.

The exhaust gas passage 35 is defined, as in the previous embodiment, through a wall of the bearing housing and the compressor back plate 27 which is disposed between the rear of the compressor wheel 15 and the bearing housing 11. As before the passage 35 extends inwardly towards the shaft and emerges at a location between compressor end seals 18 (not shown in FIG. 3) that are disposed between the shaft 10 and the bearing housing 11.

When the inlet passageway 42 is substantially closed by the movable member 44, the flow of exhaust gas through the turbine 7 is restricted thereby applying engine braking. As described in relation to the previous embodiment the speed of rotation of the turbine wheel 14 is reduced and the compressor boost pressure drops correspondingly. The application of engine braking exhaust gas pressure to the seal(s) 18 thus prevents the pressure gradient across the seal or seals dropping to a level where there is a risk of oil passing from the bearing housing 11 into the compressor housing 12.

Although not represented in the embodiment shown it is to be understood that a passageway equivalent to that (labelled 36) shown in FIG. 2 may be provided at the turbine end to supply press-wised air to the turbine end seal 19 immediately after engine braking. This will serve to prevent or restrict transient oil leakage into the turbine housing 13 when the operation of the engine switches from engine braking mode to normal fired mode.

The two embodiments described above are applicable to an arrangement where only one seal 18, 19 is used between the bearing and compressor or turbine housings 11, 12, 13. In such an instance, the exhaust gas (air) is applied axially outboard of the respective seal to ensure there is a positive pressure gradient across the seal from the compressor/turbine side to the bearing housing side.

For a single seal embodiment at the compressor end the passage 35 might emerge at a location that is radially spaced from the seal 18 and which directs the gas against the back face of the compressor impeller wheel 15 from where it impinges on the compressor side of the seal 18. For example it might emerge at a location that its less than half or one quarter of the radial length of the outer periphery of impeller wheel from the axis. Similarly passage 37 might be arranged to direct air towards the back face of the turbine wheel.

Figure 4:
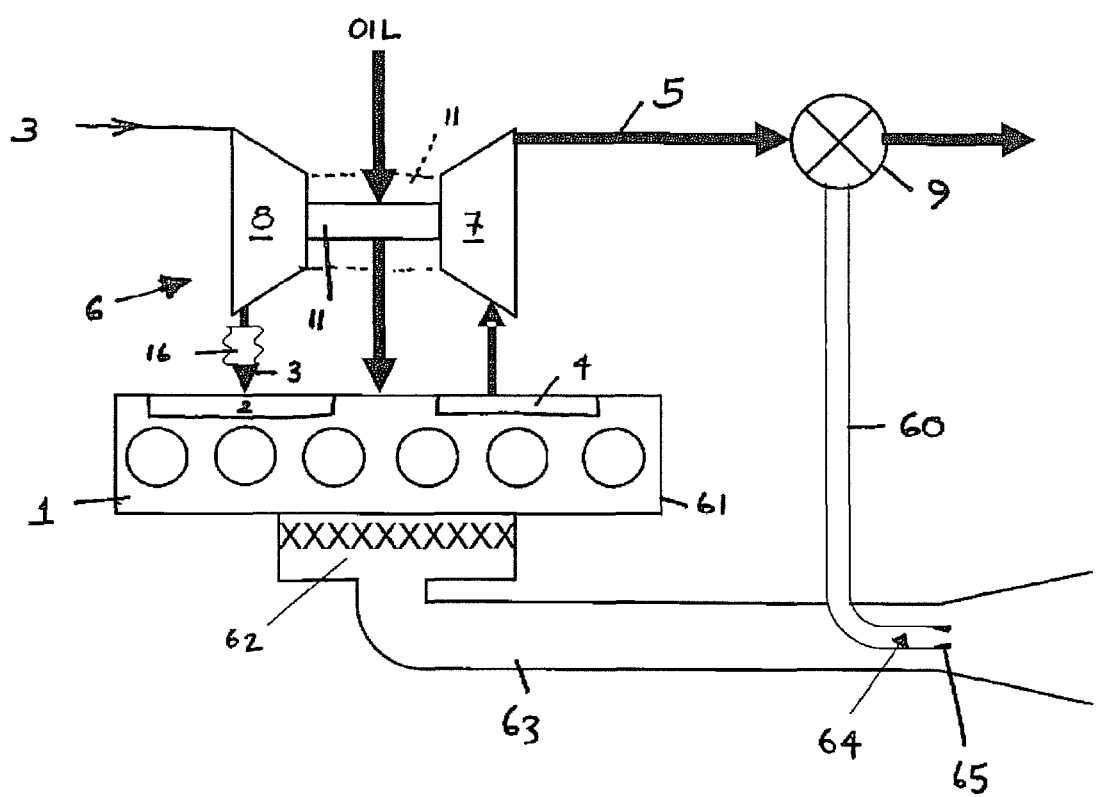
FIG. 4 is a diagrammatic representation of an alternative embodiment of the present invention.

An alternative arrangement for reducing oil leakage in the turbocharger during engine braking is shown in FIG. 4 in which the exhaust gas pressure generated during engine braking is used to reduce the internal pressure of the bearing housing 11 to achieve the same effect as described above, i.e. to maintain a positive pressure differential across the seals 18, 19 from the compressor housing 12 to the bearing housing 11 and from the turbine housing 13 to the bearing housing 11. The turbocharger 6 is not shown in detail again and it will be understood that the exemplary embodiments illustrated in FIGS. 2 and 3 may be used in this arrangement. Reference numerals for components common to the systems of FIGS. 1 to 3 are unchanged for convenience and ease of understanding. As before the exhaust brake valve 9 is disposed downstream of the turbine 7 and is operable to direct exhaust gas during engine braking mode both to an outlet and to a bleed passage 60.

During operation of the turbocharged internal combustion engine 1, high-pressure combustion gases escape from between the pistons and the cylinders in which they reciprocate, into a crankcase 61 of the engine. These "blow-by" gases are vented to restrict the pressure in the crankcase 61 as it will tend to build to such a magnitude that oil will begin to leak past seals such as those around the crankshaft. A ventilation filter 62 is usually fitted at the vent to remove oil vapour and the gases are typically recirculated to the air inlet system of the engine 1 for combustion with the usual intake of air and fuel. For a turbocharged engine these crankcase ventilation (CCV) gases are typically fed back into the air inlet path 3 upstream of the turbocharger or directly into the turbocharger through a cast boss in the compressor inlet. In this instance the CCV gases are simply depicted as being vented to a conduit 63 extending downstream of the filter 62. The bleed passage 60 from the exhaust brake valve 9 is connected to the conduit 63 in the manner of a jet pump 64 that relies upon the venturi effect. For example, the exhaust gas (air) flows out of a nozzle 65 at the end of the bleed passage and into the conduit 63 where it passes a venturi. The serves to accelerate the flow of the CCV gas and exhaust gas in the conduit and thereby to decrease the pressure in the conduit, including upstream of the jet pump 64. The pressure at the CCV vent is thereby reduced and as is the pressure in the crankcase 61. This in turn reduces the pressure at the oil sump in the crankcase 61 and, since the oil drain of the turbocharger bearing housing is connected to the oil sump in the crankcase, the pressure within the bearing housing is reduced such that the pressure differential across the seals 18, 19 is maintained. The decrease in pressure in the bearing housing is likely to be relatively low (e.g. 10-20 mbar) using this method but in many instances this will be sufficient to prevent the migration of oil along the shaft 10, past the seal(s) 18 and into the compressor housing 12. There may be a short delay in the pressure reduction being transmitted from the conduit 63 to the bearing housing 11 but since oil leakage is generally only occurs after prolonged periods of engine braking this is not thought to be problematic.

Numerous modifications and variations to the embodiment described above may be made without departing from the scope of the invention as defined in the appended claims. For example, the exhaust brake valve 9 may be combined with the bleed valve 20 so that the opening of the bleed path 17 is dependent on the operation of the exhaust brake valve 9. The plenum chamber may be omitted or in some applications may only be provided between the valve 20 and the turbine end seal(s) 19.

While the invention has been illustrated and described in detail in the drawings and foregoing description, the same is to be considered as illustrative and not restrictive in character, it being understood that only the preferred embodiments have been shown and described and that all changes and modifications that come within the scope of the inventions as defined in the claims are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. An engine braking system comprising: an internal combustion engine with an air intake path and an exhaust gas path; a turbocharger comprising a compressor for delivering pressurised air to the air intake path and a turbine for receipt of the exhaust gas from the engine, the turbine comprising a turbine wheel rotatably disposed in a turbine housing, the compressor comprising a compressor impeller rotatably disposed in a compressor housing, the turbine wheel and compressor impeller being connected by a turbocharger shaft, a bearing housing disposed between the compressor and turbine for housing a bearing assembly to support the turbocharger shaft in rotation, at least one first seal between the shaft and a compressor end of the bearing housing; an exhaust gas brake in the exhaust gas path and operable to effect engine braking, an exhaust gas bleed path extending from the exhaust gas path to a jet pump in fluid communication with the bearing housing.

2. An engine braking system according to claim 1, wherein the engine comprises a crankcase with a ventilation port, the jet pump being disposed downstream of the ventilation port.

3. An engine braking system according to claim 2, wherein the jet pump is disposed in a conduit connected to the ventilation port.

4. A powered vehicle having an engine braking system according to claim 1.

5. A method for reducing oil leakage in a turbocharger comprising a compressor for delivering pressurised air to an air intake path of an internal combustion engine, and a turbine for receipt of the exhaust gas from the engine, the turbine comprising a turbine wheel rotatably disposed in a turbine housing, the compressor comprising a compressor impeller rotatably disposed in a compressor housing, the turbine wheel and compressor impeller being connected by a turbocharger shaft, a bearing housing disposed between the compressor and turbine for housing a bearing assembly to support the turbocharger shaft in rotation, at least one seal between an end of the shaft and the bearing housing, activating an exhaust gas brake to impede the flow of exhaust gas into the turbine and diverting at least a portion of the impeded exhaust gas flow into a plenum chamber for storage therein, and following deactivation of the engine gas brake releasing the stored exhaust gas flow and directing it to the at least one seal in order to increase the pressure gradient across the at least one seal.

6. An engine braking system according to claim 1 wherein the exhaust gas brake is disposed downstream of the turbine and is operable to direct exhaust gas during an engine braking mode both to an outlet and to a bleed passage of the jet pump.

7. An engine braking system according to claim 1 wherein there is a nozzle at the end of the bleed passage.

8. An engine braking system according to claim 1 wherein the exhaust gas brake is provided by an exhaust brake valve in the exhaust gas path.

9. An engine braking system according to claim 8 wherein the exhaust brake valve is downstream of the turbine wheel.

10. An engine braking system according to claim 1 wherein the exhaust gas brake is provided by a variable geometry turbine in which a movable member is moved to reduce the size of an inlet passageway of the turbine so as to restrict the exhaust gas flow through the turbine and create back-pressure.

11. A method for reducing oil leakage according to claim 5 wherein the at least one seal is between a turbine end of the shaft and the bearing housing and following deactivation of the engine gas brake, the stored exhaust gas flow is released and directed to the at least one seal in order to increase the pressure gradient across the at least one seal in the direction from the bearing housing to the turbine housing.

12. A method for reducing oil leakage according to claim 5 wherein the at least one seal is between a compressor end of the shaft and the bearing housing and following deactivation of the engine gas brake, the stored exhaust gas flow is released and directed to the at least one seal in order to increase the pressure gradient across the at least one seal in the direction from the bearing housing to the compressor housing.

13. A method for reducing oil leakage according to claim 5 wherein the at least one seal is between a turbine end of the shaft and the bearing housing and a further at least one seal is between a compressor end of the shaft and the bearing housing.

14. A method for reducing oil leakage according to claim 13 wherein the diverted exhaust gas is directed to both the at least one seal between the compressor end of the shaft and the bearing housing and the at least one seal between the turbine end of the shaft and the bearing housing.

15. A method for reducing oil leakage according to claim 5 wherein a one-way valve is provided at the plenum chamber to prevent air escaping from the plenum chamber back into the diverted exhaust gas flow.

16. A method for reducing oil leakage according to claim 5 further comprising using an exhaust brake valve in the exhaust gas path to apply the exhaust gas brake.

17. A method for reducing oil leakage according to claim 5 further comprising using a variable geometry turbine to apply the exhaust gas brake, by moving a movable member of the turbine to reduce the size of the inlet passageway of the turbine so as to restrict the exhaust gas flow through the turbine and create the back-pressure.

* * * * *